(12) United States Patent
Liu et al.

(10) Patent No.: US 11,017,735 B2
(45) Date of Patent: May 25, 2021

(54) FIELD-SEQUENTIAL DISPLAY PANEL, DISPLAY MODULE, AND DRIVING METHOD THEREOF

(71) Applicant: BOE TECHNOLOGY GROUP CO., LTD., Beijing (CN)

(72) Inventors: Zongmin Liu, Beijing (CN); Liye Duan, Beijing (CN); Mengjun Hou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/829,445

(22) Filed: Mar. 25, 2020

(65) Prior Publication Data

US 2021/0065605 A1      Mar. 4, 2021

(30) Foreign Application Priority Data

Sep. 3, 2019   (CN) .......................... 201910829458.0

(51) Int. Cl.
*G09G 3/36* (2006.01)
*G09G 3/20* (2006.01)
*G06F 3/0488* (2013.01)

(52) U.S. Cl.
CPC ....... *G09G 3/3607* (2013.01); *G06F 3/04886* (2013.01); *G09G 3/2003* (2013.01); *G09G 2310/0235* (2013.01)

(58) Field of Classification Search
CPC ... G06F 3/04886; G06F 21/32; G09G 3/2003; G09G 3/3607; G09G 2310/0235
See application file for complete search history.

(56) References Cited

U.S. PATENT DOCUMENTS

| | | | |
|---|---|---|---|
| 2015/0271392 A1* | 9/2015 | Musgrave | G09G 3/36 348/207.11 |
| 2019/0042066 A1* | 2/2019 | Kim | G06F 3/04817 |
| 2019/0347976 A1* | 11/2019 | Um | G09G 3/2003 |
| 2019/0393286 A1* | 12/2019 | Ding | G09G 3/3225 |

* cited by examiner

*Primary Examiner* — Laurence J Lee
(74) *Attorney, Agent, or Firm* — Calfee, Halter & Griswold LLP

(57) ABSTRACT

A display panel includes: a first display area, including a plurality of first pixel units, wherein each of the first pixel units is provided with a first pixel driving circuit; a second display area, comprising a plurality of second pixel units, wherein the second pixel unit comprises a plurality of second sub-pixel units, and each of the second sub-pixel units is provided with a second sub-pixel driving circuit; and a plurality of switching units located within the second sub-pixels, wherein the switching units are connected between the second sub-pixel driving circuit and the corresponding source driving signal output terminal, and are configured to transmit, under control of a control signal, a data signal of the source driving signal output terminal to the second sub-pixel driving circuit.

20 Claims, 4 Drawing Sheets

FIELD-SEQUENTIAL DISPLAY PANEL, DISPLAY MODULE, AND DRIVING METHOD THEREOF

CROSS-REFERENCE TO RELATED APPLICATIONS

This application is based upon and claims priority to Chinese Patent Application No. 201910829458.0, filed Sep. 3, 2019, the entire contents of which are incorporated herein by reference.

TECHNICAL FIELD

The disclosure relates to the field of display technology, and more particular, to a display panel, a driving method thereof, and a display module.

BACKGROUND

In the related art, in order to achieve full-screen display, an image capturing area of a display panel is generally disposed to field sequential display. A pixel unit of the image capturing area includes only one pixel driving circuit, and a backlight source corresponding to the image capturing area may provide red, green, and blue backlight sources in a time division manner. In a frame display phase, the pixel units of the image capturing area may provide light with different brightness and different colors in a time division manner, so that color display may be provided using inertia of human eyes. Since no optical functional layer such as a color filter is required in the image capturing area, a transparent display effect may be achieved, thereby realizing full-screen display. However, each pixel unit in a conventional display area includes a plurality of sub-pixel units, and the conventional display area emits different colors of light simultaneously through the plurality of sub-pixel units, thereby achieving color display of the pixel units. Therefore, in the display panel, the image capturing area and the conventional display area have different driving methods, and it is necessary to separately set a source electrode driving circuit to achieve respective displays.

It should be noted that the information of the disclosure in the above background section is only used to enhance the understanding of the background of the disclosure, and therefore may include information that does not constitute the prior art known to those of ordinary skill in the art.

SUMMARY

An object of the present disclosure is to provide a display panel, a driving method thereof, and a display module.

According to an aspect of the present disclosure, there is provided for a display panel, which includes: a first display area, a second display area, and a plurality of switching units. The first display area includes a plurality of first pixel units, wherein each of the first pixel units is provided with a first pixel driving circuit; the second display area includes a plurality of second pixel units, wherein the second pixel unit includes a plurality of second sub-pixel units, and each of the second sub-pixel units is provided with a second sub-pixel driving circuit; wherein the first pixel driving circuit and the second sub-pixel driving circuit located in the same column are connected to the same source driving signal output terminals; and the switching units are arranged in one-to-one correspondence with the second sub-pixel units and are located in the second sub-pixels, the switching units are connected between the second sub-pixel driving circuit and the corresponding source driving signal output terminal, and are configured to transmit, under control of a control signal, a data signal of the source driving signal output terminal to the second sub-pixel driving circuit.

According to an aspect of the present disclosure, there is provided for a display panel driving method for driving the above display panel, and the method includes:

in a frame display phase, turning on the switching units in the second sub-pixel units of the same color in a time division manner, such that the first display area and the second display area are driven by the same source driving circuit to realize field sequential display.

According to an aspect of the present disclosure, there is provided for a display module, including the above display panel and a backlight module.

It should be understood that the above general description and the following detailed description are merely exemplary and explanatory, and should not limit the present disclosure.

BRIEF DESCRIPTION OF THE DRAWINGS

The drawings herein are incorporated in and constitute a part of the specification, illustrate embodiments consistent with the present disclosure, and serve to explain the principles of the present disclosure together with the description. Obviously, the drawings in the following description are just some embodiments of the present disclosure. For those of ordinary skill in the art, other drawings may be obtained based on these drawings without creative efforts.

DETAILED DESCRIPTION

Figure 1:
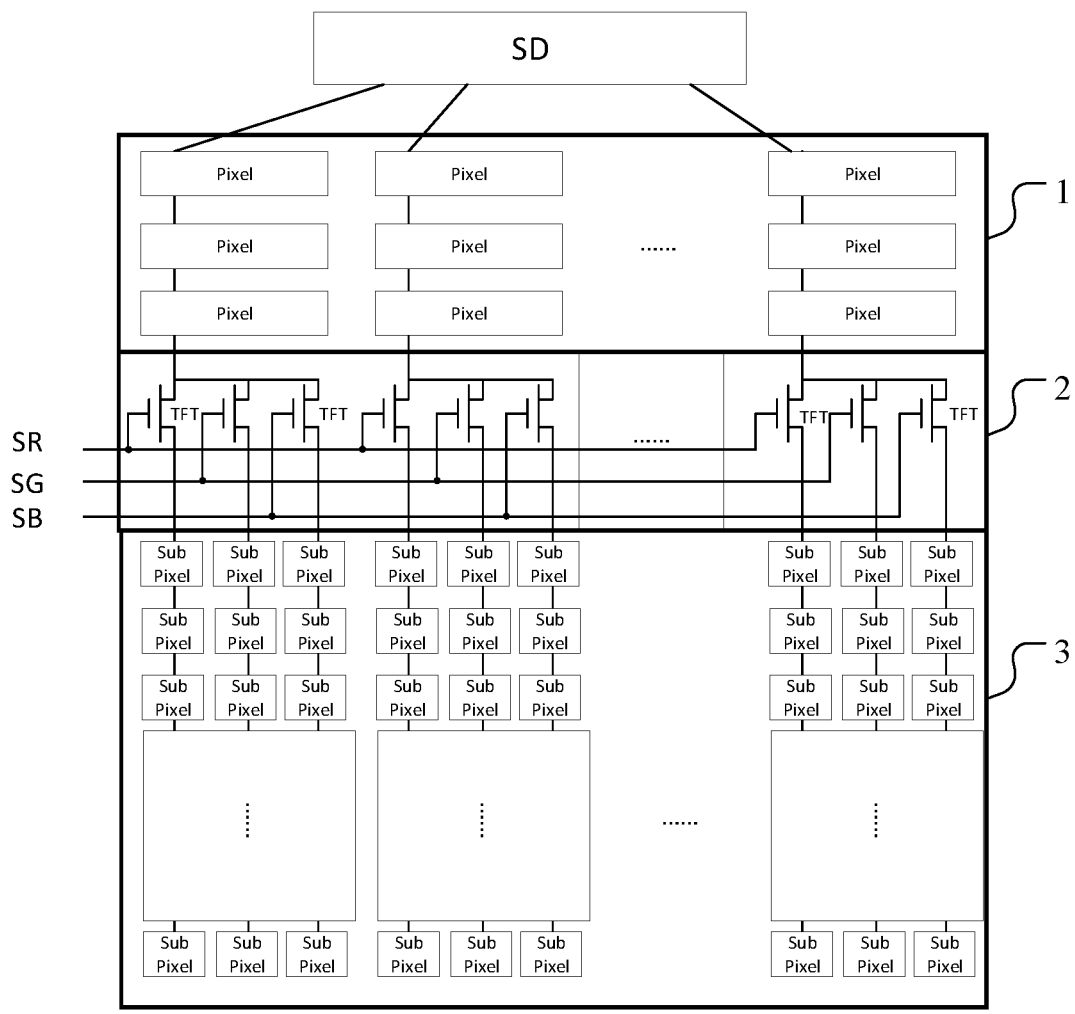
FIG. 1 is a schematic structural diagram of a display panel in the related art.

Example embodiments will now be described more fully with reference to the accompanying drawings. However, the example embodiments can be implemented in various forms and should not be construed as limited to the examples set forth herein; rather, these embodiments are provided to make the present disclosure more comprehensive and complete, and fully conveys the concepts of the example embodiments to those skilled in the art. The same reference numerals in the drawings denote the same or similar structures, and thus their detailed descriptions will be omitted.

Although relative terms such as "on" and "under" are used in this specification to describe the relative relationship between one component and another component of the icon, these terms are used in this specification for convenience only, for example, according to the illustrative direction depicted in the drawings. It can be understood that if the device of the icon is inversed and turned upside down, the component described "on" would become the component "below". Other relative terms, such as "high", "low", "top", "bottom", "left" and "right", have similar meanings. When a certain structure is "on" other structure(s), it may mean that the certain structure is integrally formed on the other structure(s), or that the certain structure is "directly" arranged on the other structure(s), or that the certain structure is "indirectly" arranged on other structure(s) through another structure.

The terms "a", "an", and "the" are used to indicate the presence of one or more elements/components/etc.; the terms "comprising" and "including" are used to indicate open-ended inclusive means, and means that there may be additional elements/components/etc., in addition to the listed elements/components/etc.

In the related art, a method is proposed in which the image capturing area and the conventional display area share the same source driving signal. In the related art a division area is disposed between the image capturing area and the conventional display area, and a plurality of switching transistors are disposed in the division area. A first terminal of the switching transistor is connected to the data line from the image capturing area, and a second terminal thereof is connected to the same row of sub-pixel units in the conventional display area, so that the image capturing area and the conventional display area may share the same source driving signal.

However, in the related art, due to the large volume of the switching transistors, the corresponding division area may occupy a large part of the display area, thereby affecting the display effect.

As shown in FIG. 1, which is a schematic structural diagram of a display panel in the related art, the display panel in the related art includes an image capturing area 1, a division area 2, and a conventional display area 3. The image capturing area 1 includes a plurality of pixel units Pixel, and each of the pixel units Pixel is provided with a pixel driving circuit. A backlight source corresponding to the image capturing area may provide red, green, and blue backlight sources in a time division manner. In a frame display phase, the pixel units of the image capturing area 1 may provide light with different brightness and different colors in a time division manner, so that color display may be provided using human inertia. Each pixel unit in the conventional display area 3 includes a plurality of sub-pixel units Sub pixel. In the related art, the division area 2 is disposed between the image capturing area 1 and the conventional display area 3, and a plurality of switching transistors TFT are disposed in the division area 2. A first terminal of the switching transistor TFT is connected to the data line from the image capturing area, and a second terminal thereof is connected to the same row of sub-pixel units Sub pixel in the conventional display area. Wherein the switching transistors corresponding to the same color sub-pixel column are controlled by the same signal control terminal. For example, the switching transistors corresponding to the red sub-pixel unit column are connected to the control signal terminal SR, and the switching transistors corresponding to the green sub-pixel unit column are connected to the control signal terminal SG, and the switching transistors corresponding to the blue sub-pixel unit column are connected to the control signal terminal SB. The display panel may realize that the image capturing area and the conventional display area may share the same source driving circuit SD. For example, when the entire image capturing area displays red, the backlight source of the image capturing area provides red light, and the red sub-pixel units are turned on simultaneously by the control signal SR through the switching transistor, such that the conventional display area 3 also displays red; when the entire image capturing area displays green, the backlight source of the image capturing area provides green light, and the green sub-pixel units are turned on simultaneously by the control signal SG through the switching transistor, such that the conventional display area 3 also displays green; when the entire image capturing area displays blue, the backlight source of the image capturing area provides blue light, and the blue sub-pixel units are turned on simultaneously by the control signal SB through the switching transistor, such that the conventional display area 3 also displays blue. However, in the related art, due to the large volume of the switching transistors, the corresponding division area 2 may occupy a large part of the display area, thereby affecting the display effect.

Figure 2:
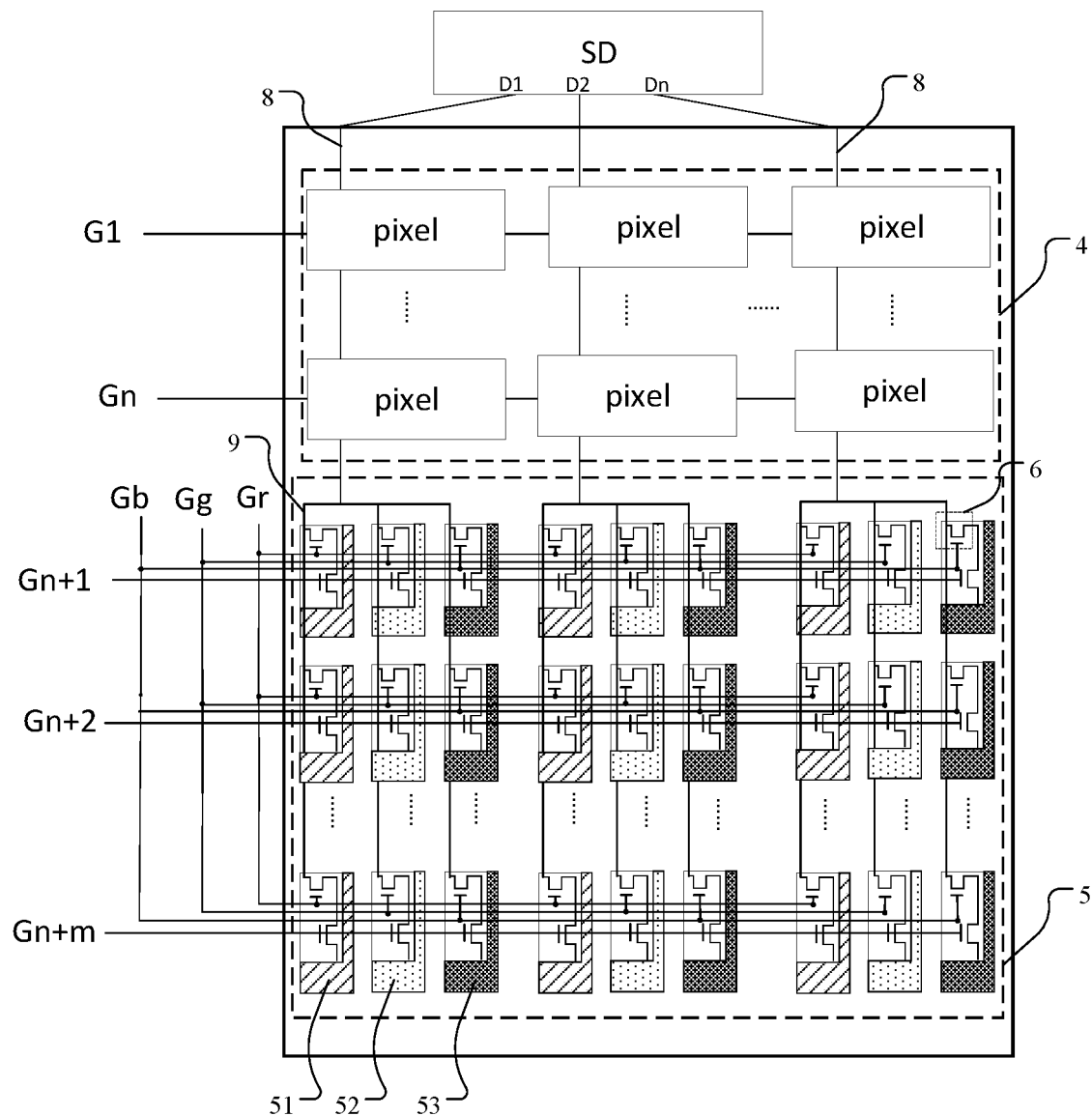
FIG. 2 is a schematic structural diagram of an exemplary embodiment of a display panel of the present disclosure.
Figure 3:
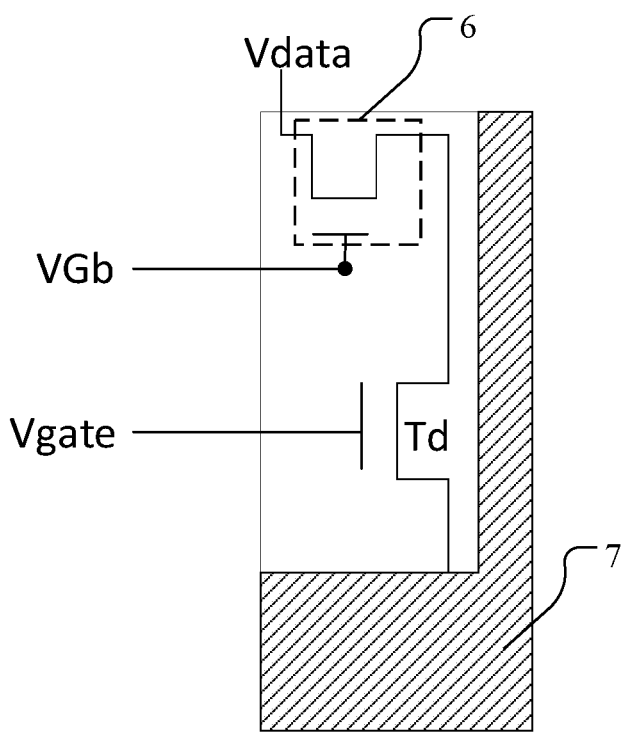
FIG. 3 is a schematic structural diagram of a second sub-pixel unit in an exemplary embodiment of a display panel of the present disclosure.

Based on this, the present exemplary embodiment provides a display panel. As shown in FIGS. 2 and 3, FIG. 2 is a schematic structural diagram of an exemplary embodiment of a display panel of the present disclosure, and FIG. 3 is a schematic structural diagram of a second sub-pixel unit in an exemplary embodiment of a display panel of the present disclosure. The display panel includes a first display area 4, a second display area 5, and a plurality of switching units 6. The first display area 4 includes a plurality of first pixel units Pixel, wherein each of the first pixel units is provided with a first pixel driving circuit (not shown in the drawing); the second display area 5 includes a plurality of second pixel units, wherein the second pixel unit includes three second sub-pixel units 51, 52, and 53, and each of the second sub-pixel units is provided with a second sub-pixel driving circuit; wherein the first pixel driving circuit and the second sub-pixel driving circuit located in the same column are connected to the same source driving signal output terminals D1, D2, . . . , Dn; and the switching units 6 are arranged in one-to-one correspondence with the second sub-pixel units and are located in the second sub-pixels, the switching units 6 are connected between the second sub-pixel driving circuit and the corresponding source driving signal output terminal, and are configured to transmit, under control of a control signal, a data signal of the source driving signal output terminal to the second sub-pixel driving circuit. Wherein the first pixel units and the second pixel units may be arranged in an array, and the first pixel units and the second pixel units are included in a column of pixel units of the display panel. Any second sub-pixel circuit in the second pixel units of a certain column is located in the same column as the first pixel circuit in the first pixel unit of the column. The source driving signal output terminals are terminals for a source driving circuit SD to output a source driving signal. The source driving signal output terminal corresponding to the second sub-pixel unit refers to a source driving signal output terminal for inputting the source driving signal to the second sub-pixel unit.

The present disclosure provides a display panel, which includes: a first display area, a second display area, and a plurality of switching units. The first display area includes a plurality of first pixel units, and each of the first pixel units is provided with a first pixel driving circuit; the second display area includes a plurality of second pixel units, wherein the second pixel unit includes a plurality of second sub-pixel units, and each of the second sub-pixel units is provided with a second sub-pixel driving circuit; wherein the first pixel units, the first pixel driving circuit and the second sub-pixel driving circuit in the second pixel units located in the same column are commonly connected to the same source driving signal output terminals; and the switching units are arranged in one-to-one correspondence with the second sub-pixel units and are located in the second sub-pixels, switching units are connected between the second sub-pixel driving circuit and the corresponding source driving signal output terminal, and are configured to transmit, under control of a control signal, a data signal of the source driving signal output terminal to the second sub-pixel driving circuit. The display panel may turn on the switching units in the second sub-pixel units of the same color in a time division manner in a frame display phase, so that the first display area and the second display area are driven by the same source driving circuit to achieve field sequential display. On one hand, the display panel provided by the present disclosure may realize that the first display area and the second display area share the same source driving circuit; on the other hand, the display panel has the switching units disposed in the sub-pixel units, thereby avoiding the setting of the division area and providing a display effect.

In this exemplary embodiment, as shown in FIG. 2, the source driving signal output terminals may be provided through the source driving circuit SD. In FIG. 2, G1, Gn, Gn+m refer to gate driving signal output terminals of a gate driving circuit in the display panel. As shown in FIG. 3, Td represents a driving transistor in the second sub-pixel driving circuit, and the driving transistor Td is connected between the switching unit 6 and a pixel electrode 7. When the switching unit 6 is turned on by a control signal VGb, the driving transistor Td may be turned on under the action of a gate driving signal Vgate to receive a source driving signal Vdata.

In the exemplary embodiment, the second pixel unit includes three second sub-pixel units, wherein the three sub-pixel units may be a red sub-pixel unit, a green sub-pixel unit, and a blue sub-pixel unit, respectively. It should be understood that, in other exemplary embodiments, the second pixel unit may further include other numbers of sub-pixel units, for example, the second pixel unit may further include a white sub-pixel unit.

In the exemplary embodiment, the display panel may further include an image capturing area for image capturing, and the first display area may be located in the image capturing area. Correspondingly, the backlight source of the image capturing area may provide red, green, and blue backlight sources in a time division manner. In a frame display phase, the pixel units of the image capturing area may provide with different brightness and different colors in a time division manner, so that color display may be provided using human inertia. Because no optical functional layer such as a color filter is required in the image capturing area, a transparent display effect may be achieved. Such an arrangement may avoid the setting of openings in the image capturing area, thereby achieving full-screen display.

In this exemplary embodiment, as shown in FIG. 2, one setting method for commonly connecting the first pixel units, the first pixel driving circuit and the second sub-pixel driving circuit in the second pixel units located in the same column to the same source driving signal output terminals may be that: the display panel may further include a plurality of main data lines 8 and a plurality of sub-data lines 9, one terminal of the main data line 8 is connected to the source driving signal output terminal, and the first pixel units Pixel located in the same column are connected to the corresponding source driving signal output terminal through one main data line 8; the second sub-pixel units 51, 52, and 53 located in the same column are respectively connected to the other terminal of the main data line through one sub-data line 9, such that the second sub-pixel units are connected to the corresponding source driving signal output terminal. Wherein the source driving signal output terminal corresponding to the first pixel unit refers to a source driving signal output terminal that provides the source driving signal to the first pixel unit. The source driving signal output terminal corresponding to the second sub-pixel unit refers to a source driving signal output terminal that provides the source driving signal to the second sub-pixel unit. It should be understood that, in other exemplary embodiments, there are more setting methods for commonly connecting the first pixel units, the first pixel driving circuit and the second sub-pixel driving circuit in the second pixel units located in the same column to the same source driving signal output terminal. For example, each source driving signal output terminal is connected to the corresponding first pixel unit and the second sub-pixel unit through only one data line.

In this exemplary embodiment, as shown in FIGS. 2 and 3, the switching unit may include a switching transistor. A first terminal of the switching transistor is connected to a data input terminal of the second sub-pixel driving circuit, a second terminal thereof is connected to the corresponding source driving signal output terminal, and a control terminal thereof receives the control signal. Wherein the data input terminal of the second sub-pixel driving circuit may be one terminal of the driving transistor Td in FIG. 3. It should be understood that there are more methods for disposing the second sub-pixel driving circuit. Accordingly, the switching transistors also have different connection methods.

In the exemplary embodiment, as shown in FIG. 2, the switching units located in the second sub-pixel units of the same color share the same control signal terminal. For example, the switching units in the second sub-pixel unit 51 share a control signal terminal Gr, the switching units in the second sub-pixel unit 52 share a control signal terminal Gg, and the switching units in the second sub-pixel unit 53 share a control signal terminal Gb.

The exemplary embodiment further provides a display panel driving method for driving the above display panel, and the method includes:

in a frame display phase, turning on the switching units in the second sub-pixel units of the same color in a time division manner, such that the first display area and the second display area are driven by the same source driving circuit to realize field sequential display.

Figure 4:
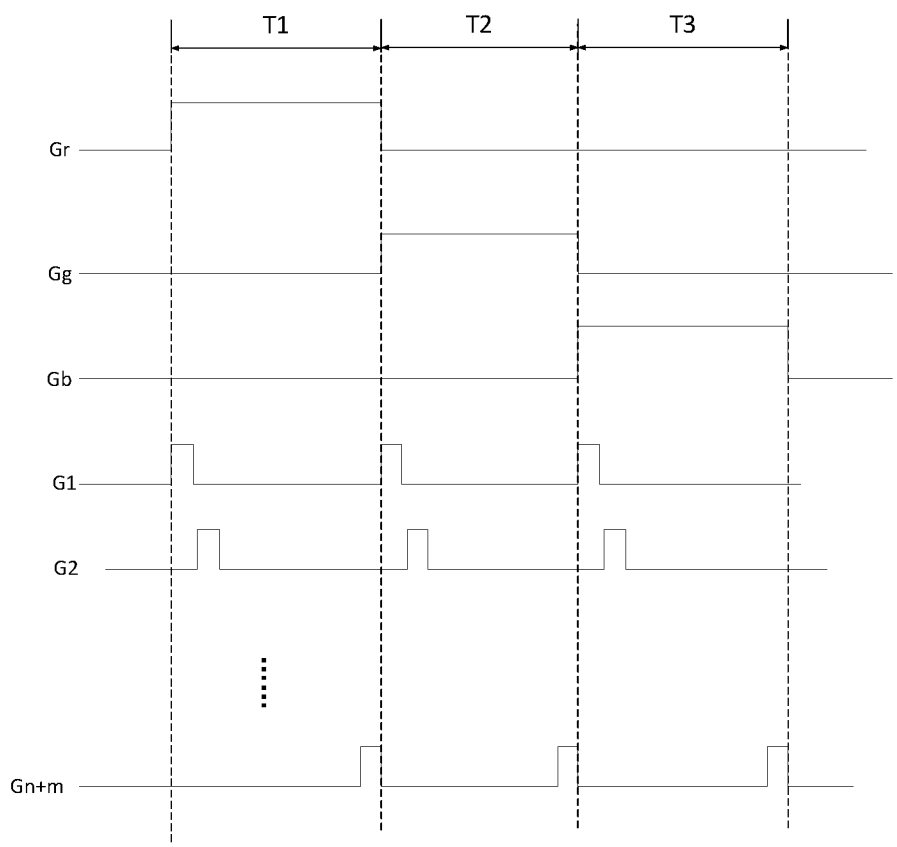
FIG. 4 is a timing diagram of each node in an exemplary embodiment of a display panel of the present disclosure.

In the exemplary embodiment, the second pixel unit may include: a red sub-pixel unit, a green sub-pixel unit, and a blue sub-pixel unit, as shown in FIG. 4, which is a timing diagram of each node in an exemplary embodiment of a display panel of the present disclosure. Wherein G1, G2, and Gn indicate the signal timing of the gate signal output terminal of the gate driving circuit of the display panel, and Gr, Gg, and Gb indicate the signal timing of the control signal terminals Gr, Gg, and Gb in FIG. 2, respectively. The method includes:

in a frame display phase:

in a first phase T1, turning on the switching units in the red sub-pixel units, such that the first display area and the second display area both display red;

in a second phase T2, turning on the switching units in the green sub-pixel units, such that the first display area and the second display area both display green; and in a third phase T3, turning on the switching units in the blue sub-pixel units, such that both the first display area and the second display area both display blue.

In the display panel driving method provided by the present disclosure, the gate driving circuit respectively completes a full-screen pixel scan in each of the first phase, the second phase, and the third phase, such that the switching units in the second sub-pixel units of the same color in the display panel are tuned on in a time division manner during a frame display phase, and the first display area and the second display area are driven by the same source driving circuit to realize field sequential display.

Figure 5:
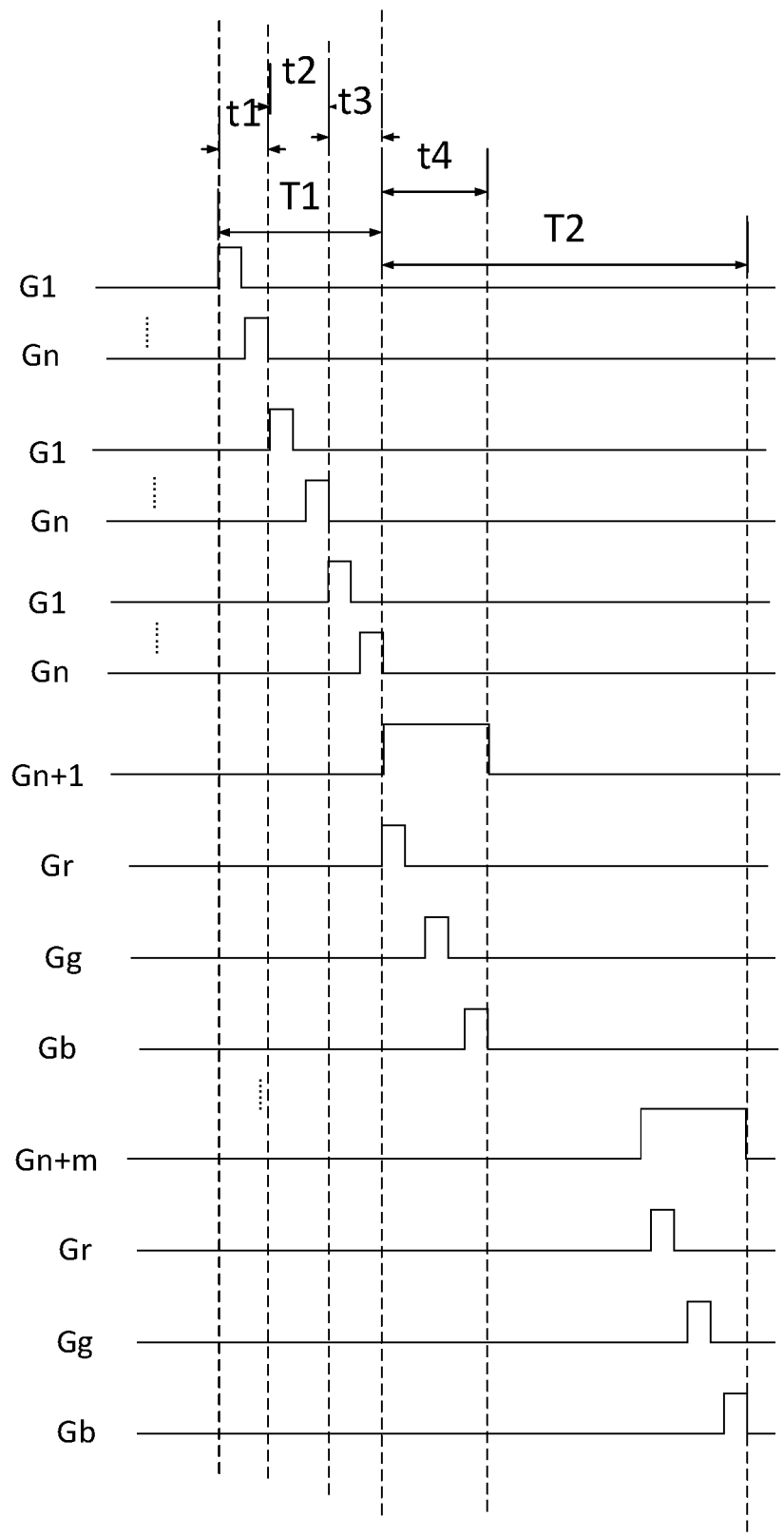
FIG. 5 is a timing diagram of each node in another exemplary embodiment of a display panel of the present disclosure.

It should be understood that, in other exemplary embodiments, the display panel may also be driven by other driving methods. As shown in FIG. 5, which is a timing diagram of each node in another exemplary embodiment of a display panel of the present disclosure, the driving method uses a source driving circuit to output two types of driving data signals, so as to drive the first display area and the second display area, respectively. As shown in FIG. 5, in the time period T1, the source driving circuit outputs a first type of source driving signal to the first display area, wherein the first type of source driving signal respectively drives the pixel units Pixel to display different colors of light in time periods t1, t2, and t3, and correspondingly a backlight source of the first display area provides light of corresponding colors in time periods t1, t2, and t3. Thereby, the first display area realizes time sequential display in the time period T1. During time period T2, the source driving circuit outputs a second type of source driving signal to the second display area, and the second type of source driving signal may realize turning on the sub-pixel units in the second display area line by line. For example, in the time period t4, the switching transistors of the (n+1)th row of sub-pixel units are all turned on by the gate driving signal Gn+1, and at the same time, the second type of source driving signal respectively outputs effective data signal when the control signals Gr, Gg, and Gb output effective level, so that the sub-pixel units are turned on line by line.

The exemplary embodiment further provides a display module, which is characterized by including the above display panel and a backlight module.

In an exemplary embodiment of the present disclosure, the backlight module includes a first backlight module and a second backlight module. The first backlight module is used to provide a color backlight source to the first display area in a time division manner; and the second backlight module is used to provide a white backlight source to the second display area. For example, the first backlight module may provide a red backlight source at the first phase T1 in FIG. 4, a green backlight source at the second phase T2 in FIG. 4, and a blue backlight source at the third phase T3 in FIG. 4, so that the first display area may achieve transparent display. It should be understood that, in other exemplary embodiments, the display module may be provided with one backlight module to provide a color backlight source to the first display area and the second display in a time division manner at the same time.

The display module provided by the present disclosure has the same technical features and working principle as the above display panel. The above contents have been described in detail, and are not repeated here.

Those skilled in the art will readily contemplate other embodiments of the present disclosure after considering the specification and practicing the disclosure disclosed herein. This application is intended to cover any variations, uses, or adaptations of the disclosure that conform to the general principles of this disclosure and include the common general knowledge or conventional technical means in the technical field not disclosed by the disclosure. It is intended that the specification and embodiments be considered as exemplary only, with a true scope and spirit of the disclosure being indicated by the claims.

It should be understood that the present disclosure is not limited to the precise structure that has been described above and illustrated in the accompanying drawings, and various modifications and changes may be made without departing from the scope thereof. The scope of the disclosure is limited only by the appending claims.

What is claimed is:

1. A display panel, comprising:
    a first display area, comprising a plurality of first pixel units, wherein each of the first pixel units is provided with a first pixel driving circuit; and
    a second display area, comprising a plurality of second pixel units, wherein the second pixel unit comprises a plurality of second sub-pixel units, and each of the second sub-pixel units is provided with a second sub-pixel driving circuit; and
    a plurality of switching units, arranged in one-to-one correspondence with the second sub-pixel units and located within the second sub-pixels, wherein the switching units are connected between the second sub-pixel driving circuit and a corresponding source driving signal output terminal, and transmit, under control of a control signal, a data signal of the source driving signal output terminal to the second sub-pixel driving circuit.

2. The display panel according to claim 1, wherein the first pixel units and the second pixel units are arranged in an array, and the first pixel driving circuit and the second sub-pixel driving circuit located in a same column are connected to a same source driving signal output terminal.

3. The display panel according to claim 1, wherein the display panel comprises an image capturing area for image capturing, and the first display area is located in the image capturing area.

4. The display panel according to claim 1, wherein the switching unit comprises:
    a switching transistor, comprising a first terminal connected to a data input terminal of the second sub-pixel driving circuit, a second terminal connected to the corresponding source driving signal output terminal, and a control terminal configured to receive the control signal.

5. The display panel according to claim 1, wherein the switching units located in the second sub-pixel units of a same color share a same control signal terminal.

6. The display panel according to claim 1, further comprising:
    a plurality of main data lines, one terminal of the main data line being connected to the source driving signal output terminal, and the first pixel units located in a same column being connected to the corresponding source driving signal output terminal through one of the main data lines; and
    a plurality of sub-data lines, the second sub-pixel units located in a same column being connected to another terminal of the main data line through one of the sub-data lines, such that the second sub-pixel units are connected to the corresponding source driving signal output terminal.

7. The display panel according to claim 1, wherein the second pixel unit comprises: a red sub-pixel unit, a green sub-pixel unit, and a blue sub-pixel unit.

8. A method for driving a display panel, the display panel comprising:
    a first display area, comprising a plurality of first pixel units, wherein each of the first pixel units is provided with a first pixel driving circuit; and
    a second display area, comprising a plurality of second pixel units, wherein the second pixel unit comprises a plurality of second sub-pixel units, and each of the second sub-pixel units is provided with a second sub-pixel driving circuit; and a plurality of switching units, arranged in one-to-one correspondence with the second sub-pixel units and located within the second sub-pixels, wherein the switching units are connected between the second sub-pixel driving circuit and a corresponding source driving signal output terminal, and transmit, under control of a control signal, a data signal of the source driving signal output terminal to the second sub-pixel driving circuit, wherein the method comprises:

in a frame display phase, turning on the switching units in the second sub-pixel units of a same color in a time division manner, causing the first display area and the second display area to be driven by a same source driving circuit to realize field sequential display.

9. The method according to claim 8, wherein the first pixel units and the second pixel units are arranged in an array, and the first pixel driving circuit and the second sub-pixel driving circuit located in a same column are connected to a same source driving signal output terminal.

10. The method panel according to claim 8, wherein the display panel comprises an image capturing area for image capturing, and the first display area is located in the image capturing area.

11. The method according to claim 8, wherein the switching unit comprises:

a switching transistor, comprising a first terminal connected to a data input terminal of the second sub-pixel driving circuit, a second terminal connected to the corresponding source driving signal output terminal, and a control terminal configured to receive the control signal.

12. The method according to claim 8, wherein the switching units located in the second sub-pixel units of a same color share a same control signal terminal.

13. The method according to claim 8, wherein the display panel further comprises:

a plurality of main data lines, one terminal of the main data line being connected to the source driving signal output terminal, and the first pixel units located in a same column being connected to the corresponding source driving signal output terminal through one of the main data lines; and a plurality of sub-data lines, the second sub-pixel units located in a same column being connected to another terminal of the main data line through one of the sub-data lines, such that the second sub-pixel units are connected to the corresponding source driving signal output terminal.

14. The method according to claim 8, wherein the second pixel unit comprises: a red sub-pixel unit, a green sub-pixel unit, and a blue sub-pixel unit, and the method comprises:

in the frame display phase:

in a first phase, turning on the switching units in the red sub-pixel units, causing both the first display area and the second display area to display red color;

in a second phase, turning on the switching units in the green sub-pixel units, causing both the first display area and the second display area to display green color; and in a third phase, turning on the switching units in the blue sub-pixel units, causing both the first display area and the second display area to display blue color.

15. A display module, comprising a display panel and a backlight module, wherein the display panel comprises:

a first display area, comprising a plurality of first pixel units, wherein each of the first pixel units is provided with a first pixel driving circuit; and a second display area, comprising a plurality of second pixel units, wherein the second pixel unit comprises a plurality of second sub-pixel units, and each of the second sub-pixel units is provided with a second sub-pixel driving circuit; and a plurality of switching units, arranged in one-to-one correspondence with the second sub-pixel units and located within the second sub-pixels, wherein the switching units are connected between the second sub-pixel driving circuit and a corresponding source driving signal output terminal, and transmit, under control of a control signal, a data signal of the source driving signal output terminal to the second sub-pixel driving circuit.

16. The display module according to claim 15, wherein the first pixel units and the second pixel units are arranged in an array, and the first pixel driving circuit and the second sub-pixel driving circuit located in a same column are connected to a same source driving signal output terminal.

17. The display module according to claim 15, wherein the switching unit comprises:

a switching transistor, comprising a first terminal connected to a data input terminal of the second sub-pixel driving circuit, a second terminal connected to the corresponding source driving signal output terminal, and a control terminal configured to receive the control signal.

18. The display module according to claim 15, wherein the switching units located in the second sub-pixel units of a same color share a same control signal terminal.

19. The display module according to claim 15, wherein the display panel further comprises:

a plurality of main data lines, one terminal of the main data line being connected to the source driving signal output terminal, and the first pixel units located in a same column being connected to the corresponding source driving signal output terminal through one of the main data lines; and a plurality of sub-data lines, the second sub-pixel units located in a same column being connected to another terminal of the main data line through one of the sub-data lines, such that the second sub-pixel units are connected to the corresponding source driving signal output terminal.

20. The display module according to claim 15, wherein the backlight module comprises at least one of:

a first backlight module, providing at least one of a color backlight source to the first display area in a time division manner or a color backlight source to the second display area in a time division manner; or a second backlight module, providing a white backlight source to the second display area.

* * * * *